United States Patent [19]

Scott

[11] 4,385,497

[45] May 31, 1983

[54] PROPULSION SYSTEM FOR WATER WHEEL

[76] Inventor: Dan J. Scott, 967 Gibbon Rd., Central Point, Oreg. 97502

[21] Appl. No.: 289,505

[22] Filed: Aug. 3, 1981

[51] Int. Cl.$^3$ ............................................. F03B 7/00
[52] U.S. Cl. ............................... 60/639; 415/DIG. 2; 416/101
[58] Field of Search ............................... 60/398, 639; 415/DIG. 2; 416/87, 101

[56] References Cited

U.S. PATENT DOCUMENTS

| | | | |
|---|---|---|---|
| 980,666 | 1/1911 | Overfield | 60/639 |
| 2,850,261 | 9/1958 | Rutkove | 416/101 X |
| 4,151,719 | 5/1979 | Boots | 60/639 |

*Primary Examiner*—Allen M. Ostrager
*Assistant Examiner*—Stephen F. Husar
*Attorney, Agent, or Firm*—Chernoff, Vilhauer, McClugg, Birdwell & Vilhauer

[57] ABSTRACT

A propulsion system for a water wheel of the type having a plurality of pontoons interconnected in diametrically opposed pairs by means of spokes which are slidably carried by the water wheel so that the pontoons on the downwardly moving side of the water wheel are at a larger radius than the pontoons on the upwardly moving side of the water wheel, includes a water course which flows a stream of water below the water wheel in a manner such that the pontoons are fully submersed in the water when the wheel is at the lowermost point of its travel, and a chute which is located upstream of the water course and causes the stream of water to drop substantially vertically prior to passing below the water wheel. The section between the chute and water course is shaped so that turbulence caused by the stream dropping through the chute is directed in a manner to urge the pontoons radially inwardly as they pass through the water course. Doors located in the radially outward walls of the pontoon are actuated between opened and closed positions by actuators, and a timing device associated with the actuators causes the door on each pontoon to open and then close when the pontoon is proximate the uppermost point of its rotation and to open and close again immediately before it enters the stream of water. A trough located above the water wheel directs water into the pontoon when the door is open near the uppermost point of travel.

5 Claims, 3 Drawing Figures tively thin walls relative to their volume so that they are buoyant when submerged in water.

Diametrically opposed pairs of the pontoons are interconnected by spokes 18 which are slidably mounted in the wheel. Thus each pair of pontoons can be positioned so that either one of the pontoons will have a larger radius with respect to the center of the water wheel than its mating pontoon. As a result, by causing all of the pontoons lying on one side of the vertical center line of the water wheel to have a larger radius than those pontoons on the other side of the water wheel, as will be more fully explained later, the water wheel will become unbalanced, thereby causing it to rotate.

The spokes are slidably carried in a carriage which includes a hollow tubular core 19, FIG. 3, having a length equal to the width of the water wheel. Located around the periphery of the core is a series of openings 20 which are arranged in pairs on diametrically opposed sides of the core. The pairs of openings 20 are arranged so that each of the spokes passes through one pair of the openings without interfering with any of the other spokes. Although not shown in the drawings, bushings can be associated with the openings to reduce friction and prevent wear.

Located radially outwardly of the core are one or more groups of annular support rings 22. The number of groups of support rings depends on the diameter of the water wheel with two groups being shown in the drawing for the purpose of illustration only. Likewise the number of support rings in each group depends on the width of the water wheel, which, due to the design of the carriage, can be made as wide as material strength will allow.

The support rings 22 are connected to the core by means of radial struts 24 and the support rings in each group are interconnected to each other by means of guide rods 25. In the embodiment illustrated the guide rods are only shown on the radially outwardmost group of support rings, however, in some cases it may be desirable to have guide rods associated with each of the groups.

In addition to tying the support rings together the guide rods 25 serve as means for slidably supporting the spokes 18. To this end the guide rods are provided in sets of two which are separated by a distance which is slightly greater than the diameter of the spokes. Since the support rings cooperate with the guide rods to support the spokes they must be arrayed laterally across the water wheel adjacent to the spokes. Thus in wide water wheels, having several support rings in each group, it may be desirable to provide spokes in conjunction with the center support rings also rather than just with the outer rings as shown.

The pontoons 16 are biased to the desired position as the wheel is turned by the action of the water in the waterway. Generally this is accomplished by each pontoon being floated upwardly as it enters the water when it is at the bottom point of its travel to place it in its minimum radius position. At this position the associated spoke 18 is locked against movement which would cause the radius of the pontoon to increase by interaction of a locking pawl 28 with mating teeth 30 located on the spoke. The pawl is positioned such that it will interact with the teeth by means of a counterweight 32. However, the counterweight is arranged so that when the pontoon has rotated to the point where its opposed pontoon has become substantially submerged, line A—A in FIG. 1, the pawl is pulled free of the teeth thereby allowing the opposed bucket to be floated upwardly from its maximum radial position to its minimum radial position.

Thus each pontoon is located in its minimum radial position from proximate the lowest point of travel to near the highest point of travel, causing the opposed pontoon to be in its maximum radial position from proximate the highest point of travel to nearly the lowest point of travel. Thus the pontoons are at a greater radius during the downward position of their travel than they are during the upward portion of their travel thereby providing a constant rotational torque on the wheel due to the increased lever arm through which the weight of the downwardly moving pontoons act.

The propulsion system which is used to drive the water wheel includes a water course 40 through which a stream of water flows directly below the water wheel. The surface of the water course is located immediately below the outermost support ring 22 of the water wheel so that each pontoon will be completely submerged when it is at its lowermost point of travel, thus ensuring that the entire pontoon is acted upon by the moving stream to cause the wheel to rotate. Also full submersion ensures that the pontoon is fully urged to its smallest radial position. In order to maximize the energy transferred from the stream of water to the water wheel in the water course, the water course preferably has a width which is only slightly greater than the width of the pontoons and a depth immediately below the water wheel which is slightly greater than the height of the pontoons.

Located upstream of the water course 40 is a chute 50 which causes the water to drop substantially vertically before it passes under the water wheel. The chute preferably has the same width as the water course 40 and is positioned in a manner such that the pontoons are submersed in the stream of water over a substantial portion of their downward travel.

Located intermediate the water course and the chute is means for directing the turbulence created by the stream of water dropping through the chute in a manner to urge the pontoons entering the water course radially inwardly. Thus the turbulence augments the natural tendency of the pontoons to be floated radially inwardly as they enter the stream of water in the water course. In the embodiment illustrated the means for causing turbulence comprises a curved bottom surface 44 in the stream channel which is arranged to direct the turbulence, upwardly, as shown by the arrows in FIG. 1, to urge the pontoons radially inwardly. However, other means, such as flow control vanes, could be used for this purpose also.

However the turbulence which is created at the bottom of a chute of falling water is unstable both directionally and durationally. Therefore tracks 46 located in each of the sidewalls of the water course are arranged to engage followers 48 located on each end of the pontoons. Thus the path which the pontoons follow as they pass through the stream of water is defined by the shape of the tracks.

Accordingly, by shaping the tracks to follow the average path the pontoons would normally travel through it serves as a dampening system. As such it prevents instability of the lifting force caused by the turbulence from causing the radial positions of the pontoons from rapidly shifting in and out as the pontoons pass through the stream of water. Otherwise the reli-

PROPULSION SYSTEM FOR WATER WHEEL

BACKGROUND AND SUMMARY OF THE INVENTION

This invention relates to a propulsion system for a water wheel, and particularly to a propulsion system which conditions the wheel to utilize gravitational forces to augment rotation.

Water wheels are one of the oldest devices known for producing power. However, heretofore water wheels have been extremely inefficient compared to other means for extracting power from a hydraulic head. Water wheels are generally propelled either by the paddle effect caused by the extremities of the wheel being placed in a moving stream, or by filling buckets mounted on the wheel with water prior to their moving downwardly on one side of the wheel and then emptying them before they start to move upwardly on the other side of the wheel. In either case the buckets or paddles must be lifted as well as dropped thus cancelling out much of the effect gravitational force has on rotation of the wheel. While gravity obviously does play a significant role in the rotation of a bucket powered wheel, the buckets are located at the same radius with respect to the center of the wheel when being lifted as when dropping. Since, for structural reasons, the weight of the buckets themselves must be quite large relative to the water they carry, the amount of power created due to gravity still remains small in light of the massive size of the water wheel.

Rutkove, U.S. Pat. No. 2,850,261 attempts to solve this problem by providing a paddle type water wheel where the paddles include weighted pontoons which are moved to a larger radius when they are on the downward portion of their travel than when they are on the upward portion of their travel. However, he uses the buoyancy force caused by the pontoons entering the stream of water to offset the opposed pontoon to the larger radius.

This has two disadvantages. Firstly, lifting the pontoons due to their buoyancy as they enter the water is somewhat self-defeating since as they initially enter the water the buoyancy force includes a tangential component, which is counter to rotation, as well as a radial component which lifts the pontoon. Thus the lifting of the pontoons is at least partially caused by lost rotational energy of the wheel. Secondly, even though the pontoons in Rutkove are at a larger radius during downward travel than they are during upward travel, their weight remains constant and thus the increased lever arm is not utilized to the maximum effect.

What is needed, therefore, is a water wheel of the type where the pontoons or buckets are at a greater radius when traveling downward than when traveling upward wherein the translation of the pontoons from the smaller radius to the larger radius position results primarily from the energy of the water course by which the wheel is propelled rather than from a loss of rotational energy of the wheel.

The water wheel of the present invention accomplishes the foregoing result by providing a water course which includes a stream of water that flows directly below the water wheel, into which the pontoons are submersed during the bottom portion of their travel, a chute which causes the water to drop substantially vertically before it passes under the water wheel, into which the pontoons extend through a substantial portion of their downward travel, and a turbulence section located at the intersection of the water course and the chute. The turbulence section is arranged so that the trubulence caused by the falling water is directed generally radially inwardly with respect to the water wheel so that it drives the pontoons radially inwardly as they are initially entering the water course, thus augmenting the natural floatation caused by the buoyancy of the pontoons. In order to assist the lifting of the pontoons a track is located in the sidewalls of the water course and followers located on the sides of the pontoons interact with the track so that the pontoons follow the path of the track as they pass through the water course.

In addition, the pontoons have pivotally mounted doors on their radially outwardly facing walls which are movable between open and closed positions by actuators. Timing means associated with the actuators cause the doors to be opened and then closed as each pontoon approaches its uppermost point and then reopened and closed immediately before it enters the water. Accordingly, water introduced into the pontoons when they are opened the first time by means of a nozzle fills the pontoons so that they are heavier when traveling downwardly. Thereafter immediately before the pontoons enter the water course the doors are reopened causing the water to be dumped so that the pontoons are empty to provide maximum buoyancy when passing through the stream and minimum weight when being lifted upwardly.

Accordingly, it is a principal objective of the present invention to provide a water wheel having peripheral pontoon weights which are located at a larger radius when they are traveling downwardly than when they are traveling upwardly.

It is further object of the present invention to provide such a water wheel wherein the pontoons are lifted primarily due to the water which propels the system.

It is a further object of the present invention to provide such a system wherein the pontoons are lifted at least partially due to the turbulence of falling water.

It is a further object of the present invention to provide such a system wherein the pontoons are openable for filling with water prior to their downward travel.

The foregoing objectives, features, and advantages of the present invention will be more readily understood upon consideration of the following detailed description of the invention taken in conjunction with the accompanying drawings.

DETAILED DESCRIPTION OF THE INVENTION

Figure 1:
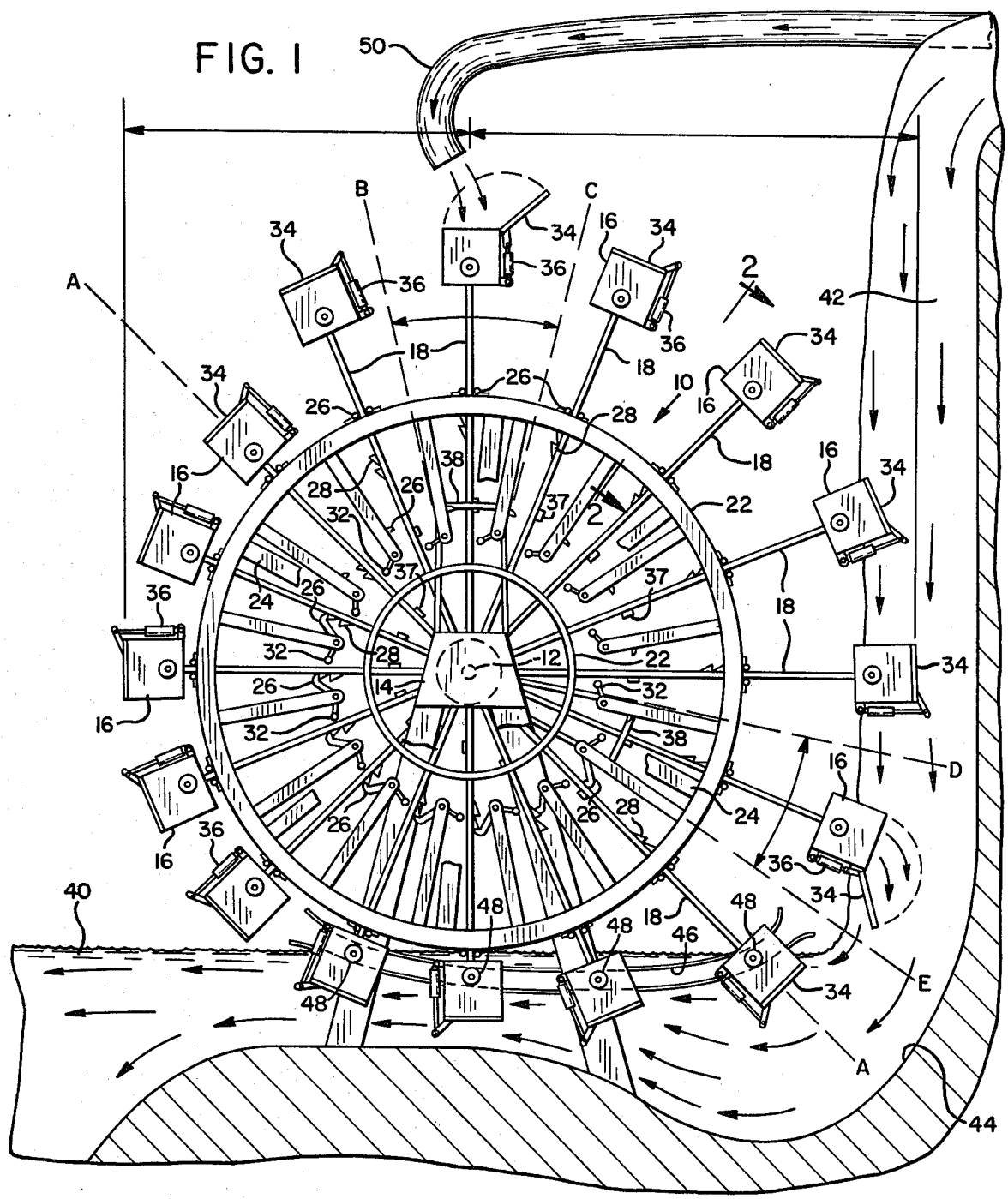
FIG. 1 is a schematic side elevational view of a water wheel and propulsion system embodying the features of the present invention.
Figure 2:
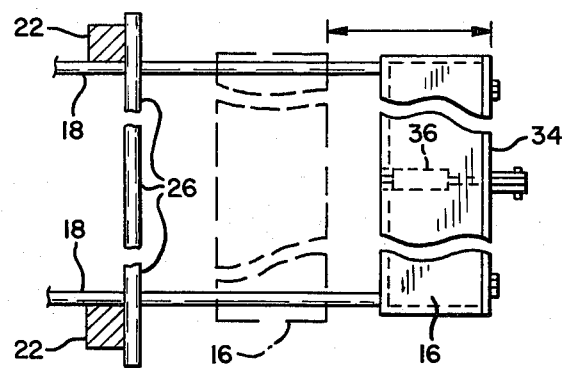
FIG. 2 is a fragmentary sectional view taken on the line 2—2 of FIG. 1.
Figure 3:
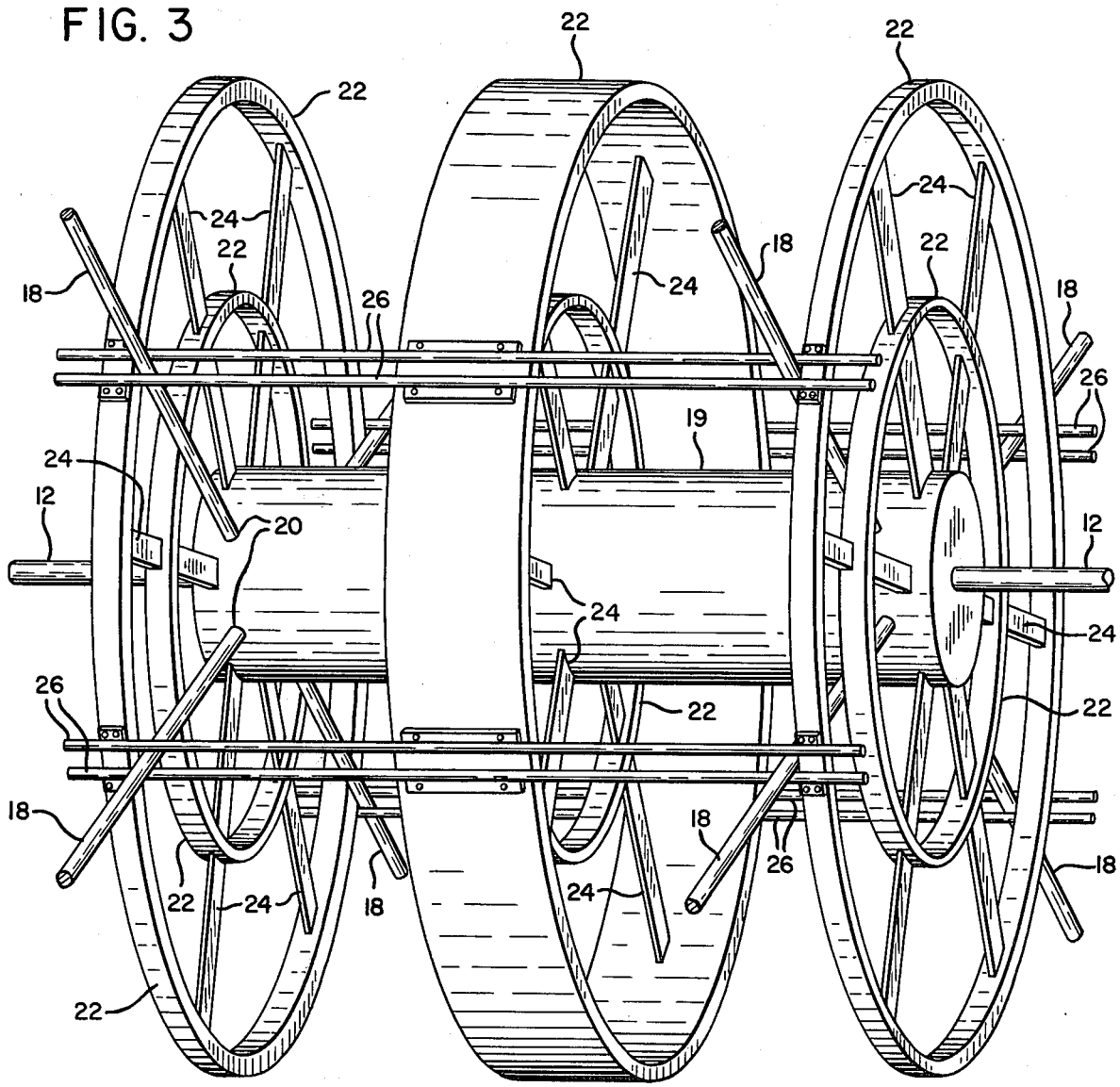
FIG. 3 is a fragmentary pictorial view of the water wheel of FIG. 1.

Referring to FIG. 1 of the drawings, the present invention includes a water wheel 10 which is rotatably mounted by means of horizontal shafts 12 located at each of its sides which are journaled in support stands 14. Located around the periphery of the water wheel are a plurality of hollow pontoons 16 which have relaance on the turbulence for lifting the pontoons could cause the pontoons to become damaged due to sudden shifting. While the track system will cause additional friction losses, on the average such losses should be minimal if the turbulence means is properly designed.

The driving force created by the pontoons having a greater lever arm while traveling downward than when traveling upward is augmented by filling the pontoons with water, and thus increasing their weight during that portion of the rotation where they are moving downward. To this end, the pontoons have pivotally mounted doors 34 on their radially outwardly facing walls and actuation means, such as electrically activated solenoids 36, attached to the pontoons are arranged to move the doors between open and closed positions.

Timing means associated with the actuation means causes the doors to be placed in an open or closed position relative to the rotational position of the water wheel. While many other systems would serve the same purpose, the timing means in the preferred embodiment illustrated includes limit switches 37 which are placed at each end of the spokes and which are electrically connected with the actuation means. Triggering devices 38 interact with the limit switches to cause the normally closed doors of each pontoon to open as that pontoon approaches the uppermost point of rotation, line B of FIG. 1, and then close again shortly after the uppermost point of rotation, line C, and to open again shortly before the pontoon enters the stream of water, line D, and then to close immediately before the pontoon enters the water, line E.

Thus each pontoon can be filled with water, such as by a nozzle 50, when its door is opened at the uppermost point of rotation and be emptied when its door is opened again just before the pontoon enters the stream of water. Accordingly each pontoon is full of water, and thus is heavier, as it is traveling downwardly and is empty while it is submerged in the stream and while it is traveling upward.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A propulsion system for a water wheel of the type having a plurality of pontoons, diametrically opposed ones of which are interconnected by common spokes that are slidably carried by the water wheel such that the pontoons can be selectively biased to position the pontoons on one side of the vertical center line of the water wheel at a first radius and the pontoons on the other side of the water wheel at a second radius which is less than said first radius, said system comprising:
   (a) water course means for flowing a stream of water below the water wheel in a manner such that when pontoons positioned at said first radius enter said stream upon rotation of the water wheel they are floated radially inwardly on said water wheel to said second radius;
   (b) chute means located upstream of said water course means for causing said stream of water to drop substantially vertically prior to passing below the water wheel; and
   (c) turbulence directing means located at the intersection of said chute means and said water course means for directing the turbulence caused by said stream dropping through said chute means in a manner to urge said pontoons radially inward as they pass through said water course.

2. The system of claim 1 including track means located in the walls of said water course and follower means associated with each of said pontoons and arranged to engage said track means for controlling the radially inward movement of said pontoons in a predetermined progression as they pass through said water course.

3. The system of claim 1 including:
   (a) doors located in the radially outward walls of said pontoons;
   (b) actuation means for moving said doors between closed positions wherein said pontoons are completely enclosed and open positions wherein said pontoons are open on the radially outward side thereof;
   (c) timing means associated with said actuation means for momentarily opening and then closing the door of each of said pontoons when it is proximate its uppermost point of rotation, and immediately before it enters said stream of water; and
   (d) trough means for providing water to fill each of said pontoons when its door is opened proximate its uppermost point of rotation.

4. The system of claim 1 wherein the water wheel includes carriage means for slidably carrying said spokes, said carriage comprising:
   (a) a tubular core having shafts extending from each end thereof;
   (b) said core defining a series of openings therein, said openings arranged in pairs which are aligned to permit each of said spokes to pass through one of said pairs diametrically through said core;
   (c) one or more groups of annular support rings each group having a different diameter than each other group;
   (d) means for connecting said groups of support rings to said core;
   (e) means for interconnecting all of the support rings in each group together; and
   (f) means associated with said support rings for slidably supporting said spokes.

5. A propulsion system for a water wheel of the type having a plurality of pontoons, diametrically opposed ones of which are interconnected by common spokes that are slidably carried by the water wheel such that the pontoons can be selectively biased to position the pontoons on one side of the vertical center line of the water wheel at a first radius and the pontoons on the other side of the water wheel at a second radius which is less than said first radius, said system comprising:
   (a) doors located in the radially outward walls of said pontoons;
   (b) actuation means for moving said doors between closed positions wherein said pontoons are completely enclosed and open positions wherein said pontoons are open on the radially outward side thereof;
   (c) timing means associated with said actuation means for momentarily opening and then closing the door of each of said pontoons when it is proximate its uppermost point of rotation, and immediately before it enters said stream of water; and
   (d) trough means for providing water to fill each of said pontoons when its door is open proximate its uppermost point of rotation.

* * * * *

UNITED STATES PATENT AND TRADEMARK OFFICE
CERTIFICATE OF CORRECTION

PATENT NO.   : 4,385,497

DATED        : May 31, 1983

INVENTOR(S)  : Dan J. Scott

It is certified that error appears in the above-identified patent and that said Letters Patent is hereby corrected as shown below:

Col. 4, line 11     Change "position" to --portion--.

Col. 4, line 33     Change "50" to --42--.

Signed and Sealed this

Sixth Day of November 1984

[SEAL]

Attest:

Attesting Officer

GERALD J. MOSSINGHOFF

Commissioner of Patents and Trademarks